(12) United States Patent
Wechsler et al.

(10) Patent No.: US 11,210,878 B2
(45) Date of Patent: Dec. 28, 2021

(54) PREMISES ACCESS SYSTEM

(71) Applicant: Comcast Cable Communications, LLC, Philadelphia, PA (US)

(72) Inventors: David Wechsler, Philadelphia, PA (US); Neal Foster, Devon, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 16/242,605

(22) Filed: Jan. 8, 2019

(65) Prior Publication Data
US 2019/0213817 A1 Jul. 11, 2019

Related U.S. Application Data

(60) Provisional application No. 62/614,968, filed on Jan. 8, 2018.

(51) Int. Cl.
*G07C 9/00* (2020.01)
*G06Q 10/08* (2012.01)

(52) U.S. Cl.
CPC ..... *G07C 9/00563* (2013.01); *G06Q 10/0832* (2013.01); *G07C 9/00571* (2013.01); *G07C 9/00817* (2013.01); *G07C 2009/00825* (2013.01)

(58) Field of Classification Search
CPC ............ C07C 9/00563; C07C 9/00571; C07C 9/00817; C07C 2009/00825; G06Q 10/0832

USPC ........................................................ 340/5.51
See application file for complete search history.

(56) References Cited

U.S. PATENT DOCUMENTS

| | | | |
|---|---|---|---|
| 2007/0192191 A1* | 8/2007 | Neal ...................... | G06Q 10/08 705/14.26 |
| 2015/0120015 A1* | 4/2015 | Fadell .................. | G08B 19/005 700/90 |
| 2015/0310381 A1* | 10/2015 | Lyman ................. | G06Q 10/083 705/330 |
| 2015/0312531 A1* | 10/2015 | Samad .................. | H04N 7/186 348/143 |
| 2017/0154347 A1* | 6/2017 | Bateman ............. | G06Q 30/0202 |
| 2018/0061154 A1* | 3/2018 | Scalisi ............... | G06K 9/00771 |
| 2019/0034859 A1* | 1/2019 | Kim .................... | G07C 9/00571 |
| 2019/0043326 A1* | 2/2019 | Madden ............. | G08B 13/1966 |

\* cited by examiner

*Primary Examiner* — Emily C Terrell
(74) *Attorney, Agent, or Firm* — Banner & Witcoff, Ltd.

(57) ABSTRACT

User access to a physical location (e.g., a homes, businesses, or other locations) may be granted for certain limited tasks based on one or more access procedures stored in a registry and associated with an identity of the user. Such access may be given without including an interaction with an owner, administrator, or manager of the location. User individuals may self-identify themselves to an access server or registry after arriving at the premises and receive corresponding access privileges via one or more devices within the premises based on access procedures stored in the access registry. The access procedures may be executed by the access server through communications with access devices within or about the premises and may be tailored based on the type of user individual or type of access requested.

18 Claims, 8 Drawing Sheets

PREMISES ACCESS SYSTEM

CROSS-REFERENCE

This application claims benefit of U.S. Provisional application 62/614,968, filed Jan. 8, 2018, the entire contents of which is incorporated herein by reference.

BACKGROUND

Many homes, businesses, or other locations, allow control over components of the structure through one or more Internet of things (IoT) devices. For example, homeowners may use a smart phone or other computing device to turn on lights within the home, adjust one or more thermostat settings, schedule a digital video recorder (DVR) to record a television program, etc. via a connection to the Internet. The various IoT devices within the home may connect to the Internet via a local network within the home, such as a Wi-Fi connection to a modem or other wireless Internet-access device. The IoT devices and applications provide increased control over various components or devices of a home or business structure, either while the operator is within the structure or located remotely.

SUMMARY

The following summary presents a simplified summary of certain features. The summary is not an extensive overview and is not intended to identify key or critical elements.

Systems, apparatuses, and methods are described for granting access to a physical location (e.g., a homes, businesses, or other locations) based on one or more access procedures stored in a registry and associated with an identity of a user. A premises administrator, such as a home owner or manager, may register visitors, such as delivery professionals, service providers (e.g., repair person, pet sitters, etc.), friends and/or neighbors, and any other individuals to whom the administrator, with an access server and/or access registry or other third parties for defined and/or limited access to a premises. Individuals who self-identify themselves to the premises in the absence of the administrator may automatically be granted corresponding access privileges by the access server and one or more devices within the premises based on access rules stored in the access registry.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

DETAILED DESCRIPTION

Figure 1:
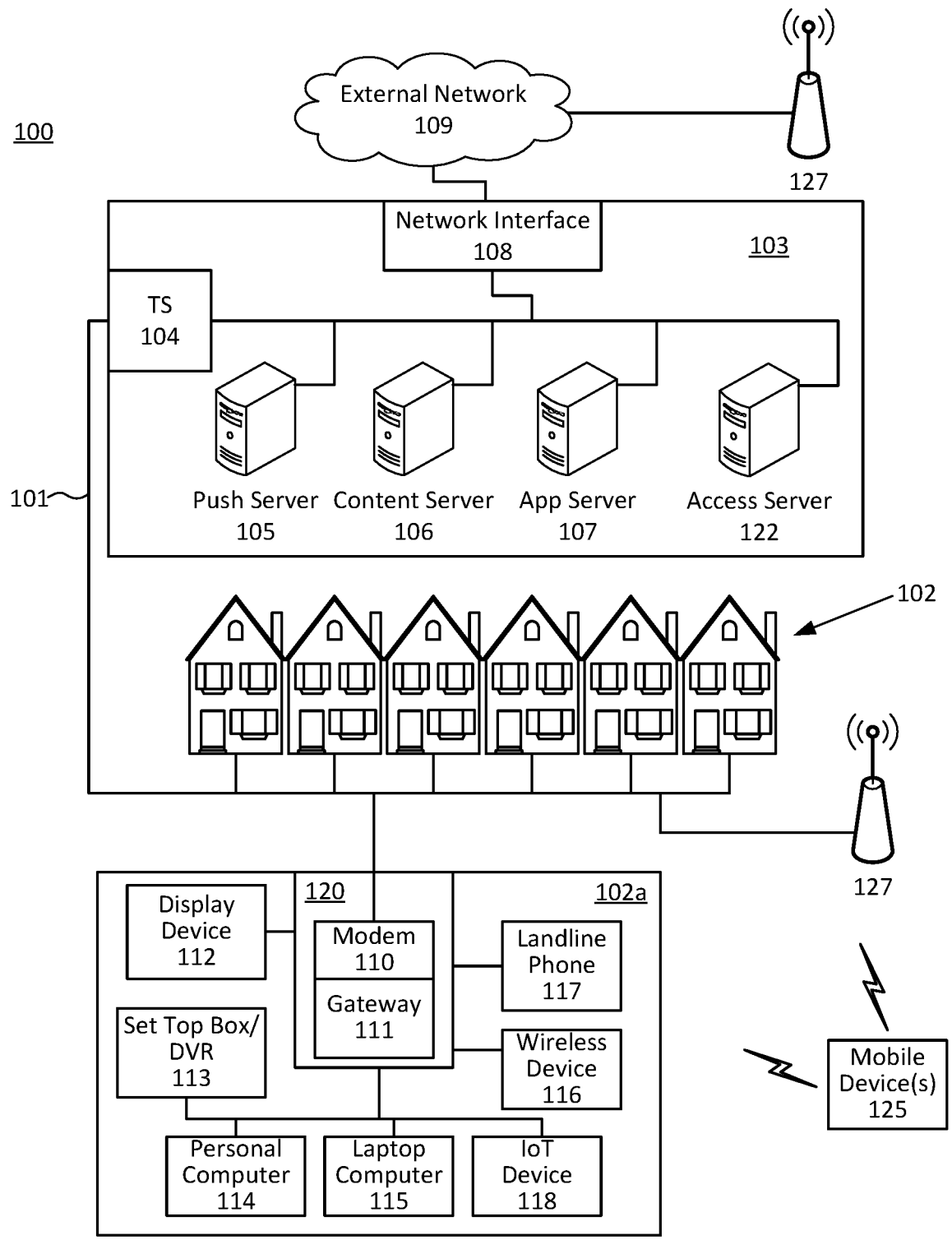
FIG. 1 shows an example communication network.

The accompanying drawings, which form a part hereof, show examples of the disclosure. It is to be understood that the examples shown in the drawings and/or discussed herein are non-exclusive and that there are other examples of how the disclosure may be practiced.

FIG. 1 shows an example communication network 100 in which features described herein may be implemented. The communication network 100 may comprise one or more information distribution networks of any type, such as, without limitation, a telephone network, a wireless network (e.g., an LTE network, a 5G network, a WiFi IEEE 802.11 network, a WiMAX network, a satellite network, and/or any other network for wireless communication), an optical fiber network, a coaxial cable network, and/or a hybrid fiber/coax distribution network. The communication network 100 may use a series of interconnected communication links 101 (e.g., coaxial cables, optical fibers, wireless links, etc.) to connect multiple premises 102 (e.g., businesses, homes, consumer dwellings, train stations, airports, etc.) to a local office 103 (e.g., a headend). The local office 103 may send downstream information signals and receive upstream information signals via the communication links 101. Each of the premises 102 may comprise devices, described below, to receive, send, and/or otherwise process those signals and information contained therein.

The communication links 101 may originate from the local office 103 and may comprise components not illustrated, such as splitters, filters, amplifiers, etc., to help convey signals clearly. The communication links 101 may be coupled to one or more wireless access points 127 configured to communicate with one or more mobile devices 125 via one or more wireless networks. The mobile devices 125 may comprise smart phones, tablets or laptop computers with wireless transceivers, tablets or laptop computers communicatively coupled to other devices with wireless transceivers, and/or any other type of device configured to communicate via a wireless network.

The local office 103 may comprise an interface 104, such as a termination system (TS). The interface 104 may comprise a cable modem termination system (CMTS) and/or other computing device(s) configured to send information downstream to, and to receive information upstream from, devices communicating with the local office 103 via the communications links 101. The interface 104 may be configured manage communications among those devices, to manage communications between those devices and back-end devices such as servers 105-107 and 122, and/or to manage communications between those devices and one or more external networks 109. The local office 103 may comprise one or more network interfaces 108 that comprise circuitry needed to communicate via the external networks 109. The external networks 109 may comprise networks of Internet devices, telephone networks, wireless networks, wireless networks, fiber optic networks, and/or any other desired network. The local office 103 may also or alternatively communicate with the mobile devices 125 via the interface 108 and one or more of the external networks 109, e.g., via one or more of the wireless access points 127.

The push notification server 105 may be configured to generate push notifications to deliver information to devices in the premises 102 and/or to the mobile devices 125. The content server 106 may be configured to provide content to devices in the premises 102 and/or to the mobile devices 125. This content may comprise, for example, video, audio, text, web pages, images, files, etc. The content server 106 (or, alternatively, an authentication server) may comprise software to validate user identities and entitlements, to locate and retrieve requested content, and/or to initiate delivery (e.g., streaming) of the content. The application server 107 may be configured to offer any desired service. For example, an application server may be responsible for collecting, and generating a download of, information for electronic program guide listings. Another application server may be responsible for monitoring user viewing habits and collecting information from that monitoring for use in selecting advertisements. Yet another application server may be responsible for formatting and inserting advertisements in a video stream being transmitted to devices in the premises 102 and/or to the mobile devices 125. The local office 103 may comprise additional servers, such as the access server 122 (described below), additional push, content, and/or application servers, and/or other types of servers. Although shown separately, the push server 105, the content server 106, the application server 107, the access server 122, and/or other server(s) may be combined. The servers 105, 106, 107, and 122, and/or other servers, may be computing devices and may comprise memory storing data and also storing computer executable instructions that, when executed by one or more processors, cause the server(s) to perform steps described herein.

An example premises 102a may comprise an interface 120. The interface 120 may comprise circuitry used to communicate via the communication links 101. The interface 120 may comprise a modem 110, which may comprise transmitters and receivers used to communicate via the communication links 101 with the local office 103. The modem 110 may comprise, for example, a coaxial cable modem (for coaxial cable lines of the communication links 101), a fiber interface node (for fiber optic lines of the communication links 101), twisted-pair telephone modem, a wireless transceiver, and/or any other desired modem device. One modem is shown in FIG. 1, but a plurality of modems operating in parallel may be implemented within the interface 120. The interface 120 may comprise a gateway 111. The modem 110 may be connected to, or be a part of, the gateway 111. The gateway 111 may be a computing device that communicates with the modem(s) 110 to allow one or more other devices in the premises 102a to communicate with the local office 103 and/or with other devices beyond the local office 103 (e.g., via the local office 103 and the external network(s) 109). The gateway 111 may comprise a set-top box (STB), digital video recorder (DVR), a digital transport adapter (DTA), a computer server, and/or any other desired computing device.

The gateway 111 may also comprise one or more local network interfaces to communicate, via one or more local networks, with devices in the premises 102a. Such devices may comprise, e.g., display devices 112 (e.g., televisions), STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA)), landline phones 117 (e.g., Voice over Internet Protocol—VoIP phones), Internet of Things (IoT) smart devices 118 (e.g., light switches, power access points, thermostats, security cameras, motion detectors, doorbells, door locks, etc.), and any other desired devices. Example types of local networks comprise Multimedia Over Coax Alliance (MoCA) networks, Ethernet networks, networks communicating via Universal Serial Bus (USB) interfaces, wireless networks (e.g., IEEE 802.11, IEEE 802.15, Bluetooth), networks communicating via in-premises power lines, and others. The lines connecting the interface 120 with the other devices in the premises 102a may represent wired or wireless connections, as may be appropriate for the type of local network used. One or more of the devices at the premises 102a may be configured to provide wireless communications channels (e.g., IEEE 802.11 channels) to communicate with one or more of the mobile devices 125, which may be on- or off-premises.

The mobile devices 125, one or more of the devices in the premises 102a, and/or other devices may receive, store, output, and/or otherwise use assets. An asset may comprise a video, a game, one or more images, software, audio, text, webpage(s), and/or other content.

Figure 2:
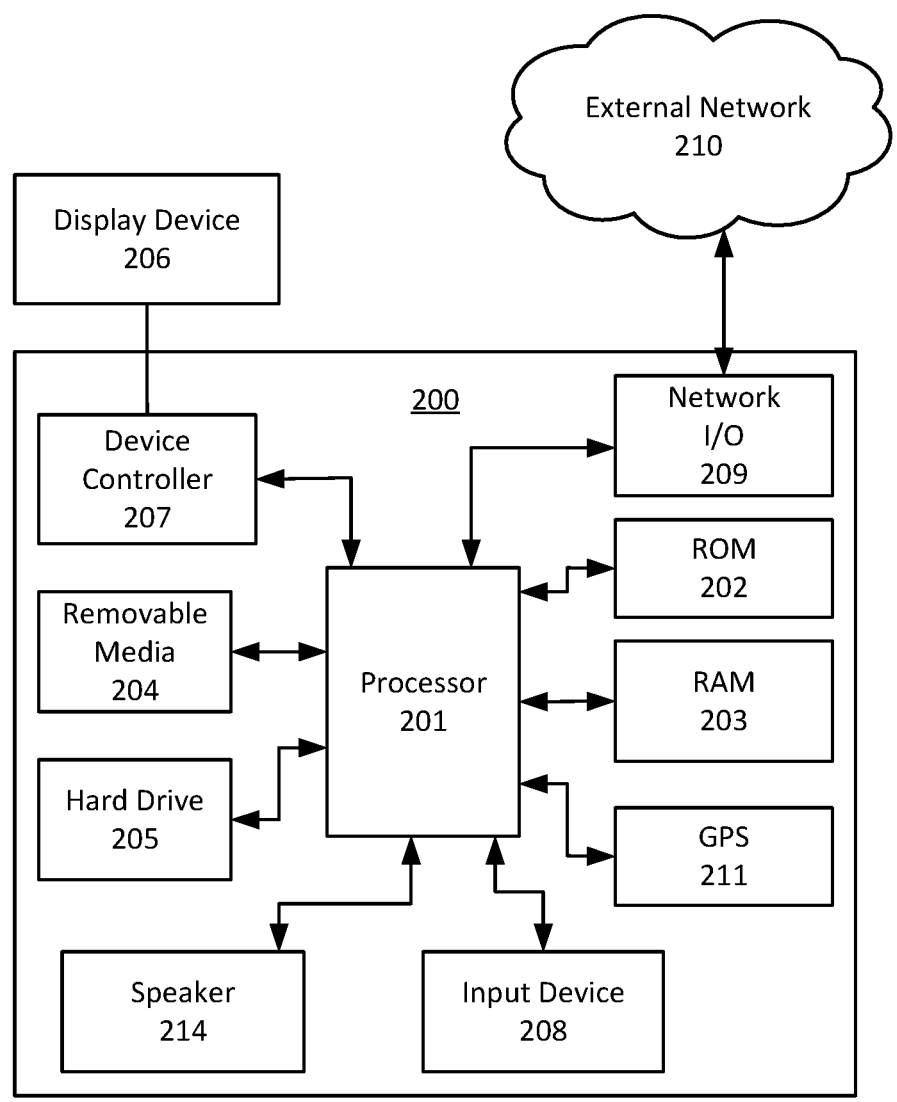
FIG. 2 shows hardware elements of a computing device.

FIG. 2 shows hardware elements of a computing device 200 that may be used to implement any of the computing devices shown in FIG. 1 (e.g., the mobile devices 125, any of the devices shown in the premises 102a, any of the devices shown in the local office 103, any of the wireless access points 127, any devices with the external network 109) and any other computing devices discussed herein (e.g., access server 122, access registry, IoT devices 118, etc.). The computing device 200 may comprise one or more processors 201, which may execute instructions of a computer program to perform any of the functions described herein. The instructions may be stored in a read-only memory (ROM) 202, random access memory (RAM) 203, removable media 204 (e.g., a USB drive, a compact disk (CD), a digital versatile disk (DVD)), and/or in any other type of computer-readable medium or memory. Instructions may also be stored in an attached (or internal) hard drive 205 or other types of storage media. The computing device 200 may comprise one or more output devices, such as a display device 206 (e.g., an external television and/or other external or internal display device) and a speaker 214, and may comprise one or more output device controllers 207, such as a video processor. One or more user input devices 208 may comprise a remote control, a keyboard, a mouse, a touch screen (which may be integrated with the display device 206), microphone, etc. The computing device 200 may also comprise one or more network interfaces, such as a network input/output (I/O) interface 210 (e.g., a network card) to communicate with an external network 209. The network I/O interface 210 may be a wired interface (e.g., electrical, RF (via coax), optical (via fiber)), a wireless interface, or a combination of the two. The network I/O interface 210 may comprise a modem configured to communicate via the external network 209. The external network 209 may comprise the communication links 101 discussed above, the external network 109, an in-home network, a network provider's wireless, coaxial, fiber, or hybrid fiber/coaxial distribution system (e.g., a DOCSIS network), or any other desired network. The communication device 200 may comprise a location-detecting device, such as a global positioning system (GPS) microprocessor 211, which may be configured to receive and process global positioning signals and determine, with possible assistance from an external server and antenna, a geographic position of the communication device 200.

Although FIG. 2 shows an example hardware configuration, one or more of the elements of the computing device 200 may be implemented as software or a combination of hardware and software. Modifications may be made to add, remove, combine, divide, etc. components of the computing device 200. Additionally, the elements shown in FIG. 2 may be implemented using basic computing devices and components that have been configured to perform operations such as are described herein. For example, a memory of the computing device 200 may store computer-executable instructions that, when executed by the processor 201 and/or one or more other processors of the computing device 200, cause the computing device 200 to perform one, some, or all of the operations described herein. Such memory and processor(s) may also or alternatively be implemented through one or more Integrated Circuits (ICs). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic. Further, an IC may be configured to output image data to a display buffer.

A premises administrator, such as a home owner or facilities manager, may register visitors, such as delivery professionals, service providers (e.g., repair person, pet sitters, etc.), friends and/or neighbors, and any other individuals to whom the administrator, with an access server and/or access registry to allow limited access to the premises based on one or more access procedures stored in a registry and associated with an identity of a visitor. Access procedures may include one or more sequence of automatic control operations of one or more access devices associated with the premises to provide a time-limited access to the premises. Such access may be given without including an interaction with an owner, administrator, or manager of the location. For example, a homeowner looking to receive a delivery of a package may be at work or otherwise away from the home when the package is scheduled to be delivered. She may wish to allow temporary access to some or all of her house to a delivery person to facilitate delivery of the item to avoid package theft, damage to the item, and the like. The homeowner may also wish to grant access to a trusted neighbor or friend so that they can access the home while the home owner is away.

The premises administrator may register visitors, such as delivery professionals, service providers (e.g., repairmen, pet sitters, etc.), friends and/or neighbors, and any other individuals to whom the homeowner would like to grant access, with the access server and/or access registry. The visitors may self-identify themselves to the access server or registry after arriving at the premises and receive corresponding access privileges by the access server and one or more devices within the premises based on access rules stored in the access registry. The access procedures or sequence of automatic control operations may be executed by the access server through one or more communications with access devices within or about the premises and may be tailored based on the type of visitor. For example, a delivery person may be granted access to a garage of the premises for delivery of a package, but access to additional rooms or areas of the premises may not be granted. For other individuals, such as trusted neighbors or friends, access to a main level of the premises may be granted while security measures of the upper levels of the premises remain activated to limit the trusted individual's access to the upper levels. The access system may control and/or facilitate various smart or IoT devices within the premises to execute the access procedures for the identified visitor.

Temporary or limited access procedures for users or visitors to the premises may be created or modified by the administrator of the premises through the access server. The access server may store registered users, unique identifiers associated with the users, and one or more access procedures for gaining access to the premises in a registry as associated with a premises account of the access server. Instructions and/or directions to users for interacting with the access system and the premises may be provided to a computing device of the user of on a display or other information providing device of the premises. The access server may also provide control instructions or commands to devices within or about the premises to execute the access procedures associated with a user. Various access procedures may be associated with a premises based on an identity of the user, a type of access requested for the premises, and/or a type of user to the premises. Access procedures for users to the premises may also be created or modified based on a communication received at the access server associated with the visit to the premises by the user. For example, an email or other correspondence from the user corresponding to or confirming a recent online purchase may be provided to the access server from which one or more access procedures for entry into the premises may be generated.

Figure 3:
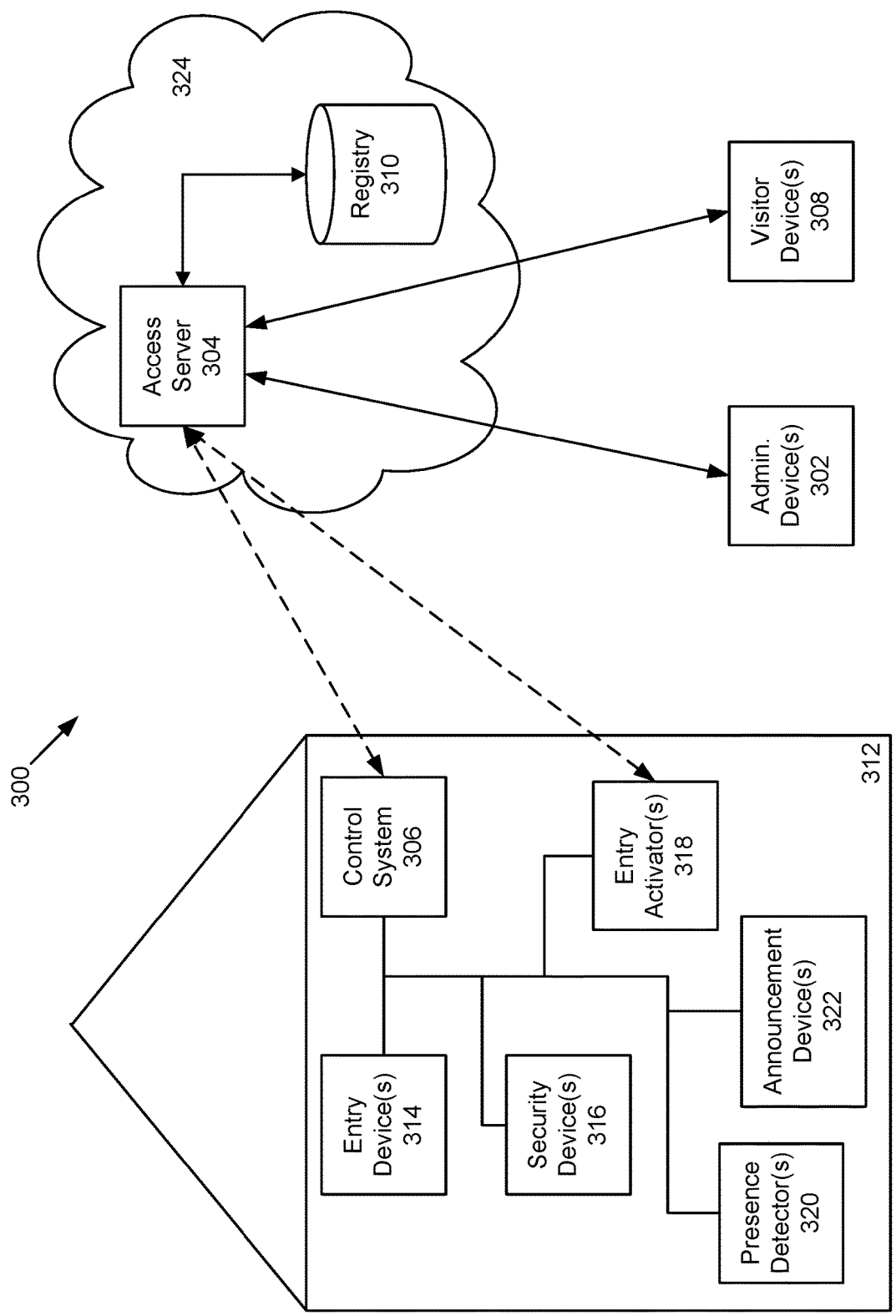
FIG. 3 shows an example system for granting user limited access to a premises based on one or more access procedures.

FIG. 3 shows an example system 300 for granting user limited access to a premises 312 based on one or more access rules associated with an identifier of the user. Through the system 300 and as explained in more detail below, an owner, manager, administrator, etc. may create one or more access rules or procedures for users to gain access to a premises 312, such as a home or business. The owner may provide the access procedures for a user, such as a delivery person, a family member, a trusted neighbor, a repair person, etc., via a administrator device 302 in communication with an access server 304. The access server 304 may generate a unique identifier for the user and store the access procedures for the user in the registry with the unique identifier. The access server 304 may provide the unique identifier of the user to the administrator device 302. A user may provide some indication of an intent to enter or gain some level of access to the premises 312. For example, the user may use a visitor communication device 308 to alert the access server 304 that access to the premises is requested. The indication from the user may include the unique identifier associated with the user to identify the user with the access server 304. The access server 304 may verify the unique identifier as associated with the user and retrieve one or more access procedures to the premises 312 from the registry 310.

With the one or more access procedures associated with the user, the access server 304 may provide one or more control signals or instructions to one or more devices of the premises to facilitate the access procedures obtained and/or determined from the access registry 310. For example, the access server 304 may provide control signals to a control system 306 associated with the premises 312. The control system 306 may generate one or more instructions or otherwise control various access devices 314-322 of the premises. The access devices 314-322 may include, but are not limited to, one or more entry devices 314 (such as electronic keypads associated with doors or windows of the premises 312 and the like), security devices 316 (such as cameras, alarm systems, temperature sensors, and the like), entry activators 318 (such as electronic door locks, garage door openers, outer gate controllers, and the like), presence detectors 320 (such as motion detectors associated with entry points of the premises, temperature sensors, microwave presence detectors, pressure detectors, and the like), and announcement devices 322 (such as displays, audio devices, and the like). The announcement devices 322 may be used to provide information to the user associated with the access procedures to be implemented. The access server 304 may also communicate directly with the access devices 314-322. For example, access server 304 may generate an instruction for an entry activator 318 and transmit the instruction to the entry activator 318 via a wireless connection (such as via a WiFi connection to the entry activator 318) or wired connection. The access server 304 may provide communications and instructions to any of the access devices 314-322 of the premises 322 to execute the access procedure associated with the user. The operation and interaction between the components of the system 300 are discussed in more detail below with relation to FIGS. 4-8.

The components of the system 300 may communicate with the access server 304 via any communication mechanism or protocol. For example, the access server 304 may be included or otherwise instantiated in a network 324 or other computing environment. Transmission of communications to and from the access server 304 may occur via a wireless or wired connection to the network 324. For example, administrator device 302 may be a cellular or other smart communication device that connects to a wireless network. Routing of communications to the access server 304 may occur via the network 324 to reach the access server. The access registry 310 may similarly be instantiated in the network 324. Access server 304 may communicate with the access registry 310 to store and retrieve access procedures associated with one or more users of the premises 312. The access registry 310 may also be separate from the network 324 (e.g., instantiated in a communication network separate from network 324) or may be a component of the access server 304.

Access devices 314-322 may be one or more smart devices or Internet of Things (IoT) devices. Such devices may receive and/or transmit information via a connection to a network, such as the Internet. Access devices 314-322 may thus be controlled via a computing device also connected to the Internet. For example, security devices 316 may be installed at the premises 312 and wirelessly connected to a wireless network of the premises, such as a WiFi connection or wireless connection to a Local Area Network (LAN). Security devices 316 may also connect to the network via a wired connection. An operator or user of the security devices 316 may transmit instructions to the security devices 316 to control operation of the devices via the Internet. An application configured to control the security devices 316 may be downloaded and installed on a computing device, such as a computing device (such as a smart phone or laptop computer) operated by an owner or manager of the premises. The security device application may, as executed by the computing device, provide an interface through which a user of the computing device provides control instructions to the security devices 316. Information from the security devices 316, such as activation information, setting information, alarms, or any other information associated with the security devices, may be transmitted to the user computing device and/or the control application of the security devices. The application thus provides an interface to communicate with and control the associated access device 314-322 of the premises.

Control signals provided by and received at the device application may be of a form or protocol designated by the controlled device. For example, a wireless camera device 320 may receive control instructions from a wireless camera device application installed on the user computing device. Control instructions transmitted to the camera from the camera application may be of a type of a communication protocol used to communicate between the application and the device. Other devices, such a wireless keypad entry system or motion detector, may use alternate or different communication protocols to communicate with their respective control applications. Each of the access devices 314-322 of the premises 312 may use a different communication protocol or format to receive control instructions and provide operational information to a controlling application.

A control system 306 of the premises 312 may receive control instructions for the access devices 314-322 of the premises and provide the instructions to the designated device. For example, a control application of a user computing device for a presence detector 320 of the premises 312 may be programmed to transmit control instructions to the control system 306. The control system 306 may forward the received control instruction to the presence detector 320 for execution by the detector. The control system may also translate the received instruction into a communication protocol or form used by the presence detector 320. The control system 306 may thus operate as a controller of one or more of the access devices 314-322 of the premises 312 to receive instructions or communications from one or more corresponding control applications and transmit those instructions to the devices. Interface 120 discussed above in relation to FIG. 1 may be one example of a control system 306 used to receive and transmit control instructions for the access devices 314-322.

Figure 4:
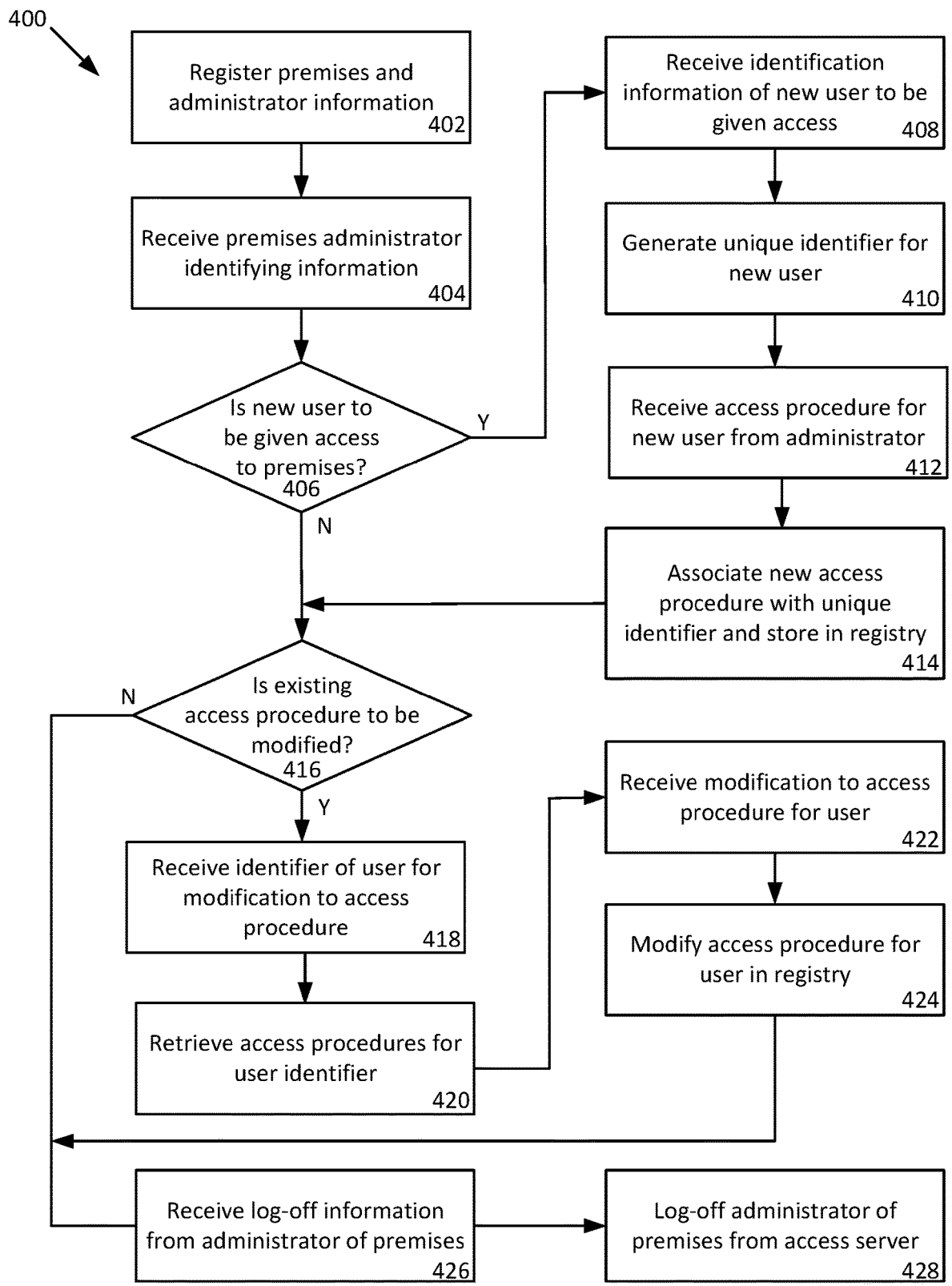
FIG. 4 is a flow chart showing an example method for generating one or more access procedures for a premises for granting user limited access.

FIG. 4 is a flow chart showing an example method 400 for generating one or more access procedures for granting a user limited or temporary access to a premises 312. As mentioned above, the system 300 of FIG. 3 may determine from an access registry 310 one or more access procedures for granting temporary access to a premises 312 for a user. The access procedures for a user may be provided by an administrator of the premises 312, such as a home owner, a site manager, security personnel, etc. Access procedures may include controlling one or more devices 314-322 of the premises 312 to provide temporary access to the premises based on an identification of the visitor or user, such as providing access to a delivery person in response to a package delivery to the premises, and returning the one or more devices to a secure state once the temporary access has been completed. The method 400 of FIG. 4 may describe a process for receiving or altering one or more access procedures for granting a user limited access to a premises from an administrator of the premises 312. The one or more access procedures may be stored in an access registry 310 for implementation after the user arrives at the premises 312, as described in more detail below. Although the steps of the method 400 of FIG. 4 are described as being performed by the access server 304, any component of the system 100 of FIG. 1 or the system 300 of FIG. 3 may perform one or more of the steps of the method.

At step 402, the access server 304 may receive information registering the premises 312 and a premise administrator with the system 300. The premises administrator may be any individual provided with control over the access rights to the premises 312. For example, an owner of a home may decide a level of access to associate with a user in relation to the home. A building supervisor for a business or office building may also be an administrator of the premises 312 to provide access procedures for users to the building. Premise administrators may register with the access server 304 as the administrator of the premises 312. Registering with the access server 304 may include providing identification information to the access server, such as the name of the administrator, contact information for the administrator (such as telephone numbers, email addresses, etc.), one or more administrator devices 302 associated with the administrator, the location of the premise 312, identification of the type of access devices 314-322 of the premises 312 (such as make/model information), passwords and usernames of one or more applications associated with the access devices 314-322, connectivity information to the premises (such as one or more Internet Protocol (IP) addresses of the access devices, modem connectivity information/passwords, router information, etc.), relative location of access devices within or near the premises, unique identifiers of the access devices (such as "backdoor lock", "garage door", "camera in child A's room", "motion detector/front hall", "doorbell display", etc.), and the like. Any information facilitating the determining and execution of one or more access procedures to the premises 312 may be provided by the administrator or other party to register the premises and the administrator with the access server 304. The access server 304 may also provide a unique identifier and password to the administrator associated with the administrator's account with the access server. The administrator identifier and password may be provided by the administrator to the access server 304 to access an account for the premises 312 and/or otherwise identify the administrator with the access server.

To register with the access server 304, the administrator may navigate a web browser of a computing device to an access server 304 webpage to access a user interface of the access server 304. For example, an administrator may use a web browser executed on the administrator device 302 to receive the user interface for the access server 304. Through the user interface, the registration information discussed above for the premises 312 may be provided by the administrator and an account may be associated with premises may be created. To access premises account information via the user interface, the administrator may provide identification information (such as a username and password) that the access server 304 may verify with a listing of registered administrators. Information concerning the premises account may also be provided to the administrator, such as a listing of access procedures associated with the premises 312, identified users with access to the premises, messages for the administrator (including attempted access requests to the premises), and the like. In general, any information that provides management of the premises access via the access server 304 may be provided via the user interface.

In step 404, the access server 304 may receive administrator identifying information for a premises 312 registered with the access server. Such identifying information may include a username and/or password to access the user interface associated with the access server. Any identifying information may be provided via the user interface by the administrator as requested by the interface to identify the administrator. Further, the user interface may verify the identifying information, such as through a look up to a database of administrator information, and associate one or more premises account with the administrator.

In step 406, the access server 304 may determine if an access procedure is to be generated for a newly identified user to the premises 312. For example, the administrator may indicate, via the user interface, to add a trusted user to a listing of users provided temporary access to the premises 312 via the access system 300. The indication to add the user may be provided by the administrator through one or more inputs to the user interface, such as through a selection of an "add visitor" button or option in a menu. Trusted visitors may also be added through an analysis of communications received at a administrator device 302 of the administrator. For example, temporary access may be given for a delivery person associated with purchase on an Internet retailer's website. The purchase may include sending an email communication to the administrator of the premises. From the communication, a representative of the online retailer may be added as a trusted visitor to the premises and temporary access to the premises may be granted. Temporary access may also be granted for maintenance workers to perform a scheduled maintenance at the premises. The administrator may schedule the maintenance work to be performed associated with a date and time and one or more workers to perform the maintenance may be added as trusted visitors for the temporary access to the premises. A new user granted temporary access may be associated with a delivery, home services, emergency services, house cleaning, dog-walking, real estate agent, gardener, pool cleaner, neighbor, friend, family member, etc. such that the access registry 310 may include any person that may request temporary access to the premises 312.

If a new user is to be added to a list of trusted visitors to the premises 312, the access server 304 may receive identification information of the new user to be given access in step 408. The identification information of the new user may be transmitted to the access server 304 from the administrator device 302 of the administrator via the user interface. The identification information of the user may also be determined from one or more communications provided to the administrator of access server 304 associated with an online purchase, work order, routine maintenance, and the like. The new user identification information may include one or more types of identifying information, such as name, age, physical description, identification numbers (such as social security number, driver's license number, etc.), biometric information (such as fingerprint, retinal scan, etc.) relation to the administrator (such as "trusted neighbor", "son", "water delivery person", "water heater repairman", "house cleaner", etc.). estimated date/time of visit to the premises 312, a level of trust associated with the user, contact information (such as email address, telephone number, text capabilities, mailing address, etc.), information associated with a purpose for visiting the premises (such as a package tracking number, repair order number, etc.) and the like.

The access server 304 may generate a unique identifier for the new user in step 410 based on the identification information received. For example, a unique identifier code may be generated for each user provided with access to the premises 312. The unique code may be any identifier that is different from other registered visitors to the premises 312, such as a string of alphanumeric characters, a string of numbers, a fingerprint, etc. For example, an administrator who is a home owner may access the system 300 to provide access to the home for a neighbor, Sally Jones. The administrator may provide identifying information for Sally Jones to the access server 304. The access server 304 may generate a unique identification code, such as "SJ123." Identifying information for delivery persons may be generated from a communication received at the access server 304 associated with an internet purchase, scheduled maintenance, etc. A package identifier (such as a tracking number), identification of a delivery or maintenance company, particular visitors to the premises to deliver the package or perform the maintenance, an estimated day/time of the temporary access to the premises, and the like may be determined from the received communication. Generating the unique identifier may also include receiving an identifier from the administrator device 302 and verifying that other users to the premises 312 are not associated with identifier. If the identifier code is unique, the access server 304 may associate the identifier code with the received user information.

The generated unique identifier for the new user may be provided to the administrator and/or the new user for use in accessing the premises. For example, the access server 304 may provide the unique identification code to the administrator in the user interface displayed on the administrator device 302. The access server 304 may also send the unique identification code to the user using one or more of the contact information determined above for the user. For example, the access server 304 may send an email to the user's email address with the unique identification code and informing the user that they have been registered with the access server 304 for limited access to the premises. The unique access identification code for the user may be used to identify the user with the system 300 for gaining some level of access to the premises 312.

At step 412, the access server 304 may receive one or more access procedures for the new user associated with the premises 312. The one or more access procedures may be provided to the access server 304 from the administrator, such as via the user interface accessed on the administrator device 302 or other computing device used by the administrator. An access procedure includes information or instructions on activation and use of access devices 314-322 of the premises to provide some level of limited or temporary access to the premises. For example, an access procedure for a trusted neighbor such as Sally Jones may include a procedure of: disarming an alarm system or other security device 316, unlocking one or more doors of the premises through activation of one or more entry devices 314, receiving and ignoring presence information sent from one or more presence detectors 320 on a first floor of the premises, activating a security camera if presence on a second floor is detected, opening a garage door through a garage entry activator 318, securing the home again through the security devices, entry devices, and/or entry activators after some time or upon entry of a code into an entry device, and the like. An access procedure for a delivery person may include activating a garage entry activator 318 to open a garage for 30 seconds, followed by activating the garage entry activator to close the garage. Some access procedures may include providing some type of information to a visitor at the premises 312 through an announcement device 322. The message may include instructions to the visitor on the access procedures that are to occur and instruct the visitor they visitor on actions to be taken. For example, an announcement device 322 may be configured to display a message of: "UPS driver—please proceed to west side of house. You will see a side door with a keypad lock. Use one-time code 1$a$2$b$3$c$ for mudroom access. Please leave package there and close door behind you. Note, the alarm will be disabled for 30 seconds and your actions will be recorded. The system will re-arm once the door closes and the code will no longer work." One or more access procedures may accompany the announcement from the announcement device 322. For example, a sidedoor entry device 314 may be programmed with the one-time code to allow access, an alarm or other security system 316 may be disabled for time period, a camera device may be activated near the sidedoor area of the premises 312, and the alarm system may be re-armed after the time period. As explained in more detail below, one or more instructions from the access server 304 may be provided or sent to the devices 314-322 and/or control system 306 of the premises 312 to execute the one or more access procedures for the user. The one or more access procedures for the user may include any combination of activation, deactivation, programming, controlling, accessing, receiving sensor data and/or information, and the like from any of the limited or temporary access devices 314-322 and/or the control system 306 of the premises 312. Further, the one or more access procedures may be configured to provide a level of access to the premises 312 to a user as designated by the administrator. For example, a trusted friend or neighbor may be associated with access procedures that allow full access to the premises for a limited time through unlocking of entry devices 314 and disabling of security devices 316 and presence detectors 320. Less trusted users may be given a more restricted access to the premises 312, such as a timed access, access limited to particular areas of the premises, enhanced security procedures, and the like. The administrator may select one or more access procedures to associate with a user, in some instances from a list of pre-defined access procedures, such that the administrator may determine the level of access given to each identified user to the premises 312. The access server 304 may also generate one or more access procedures for a user based on information determined about the user from one or communications, as explained in more detail below with reference to FIG. 7. For example, access procedures associated with an online purchase or retailer may be received at the access server 304. The access procedures may be provided to the online retailer at the time of purchase and included in the communication received at the access server. For example, a homeowner may purchase a package from an online retailer and provide the one or more access procedures for delivering the package to the premises 312 to the online retailer. The retailer may generate an approval or acknowledgement communication, such as an email, and provide that communication to the access sever 304. The access server 304 may associate the received access procedures with a delivery person to the premises 312 to deliver the ordered package.

The access procedures for one or more user to the premises 312 may be based on a status of an administrator or homeowner. For example, a first set of access procedures may be provided for a user when the homeowner is at work and a second set of access procedures may be provided for the user when the homeowner is on vacation. The second set of access procedures may further limit the access granted to the premises 312 when the homeowner is unlikely to return to the premises soon. The status of the homeowner or administrator may be determined by the access server 304 via a calendar program associated with the administrator. For example, the access server 304 may be provided access to the administrator device 302. The administrator device 302 may include a calendar program that includes the administrator or homeowner's movements or status. The access serve 304 may use the administrator's status to determine a set of access procedures to retrieve from the access registry 310 in response to a visit to the premises 312 by a user.

Other sets of access procedures may also be associated with a user and stored with the access registry 310. For example, a first set of access procedures may be associated with a plumber to facilitate the plumber conducting routine maintenance on the premises 312. A second set of access procedures may be associated with the plumber for emergency situations, such as a burst pipe in the premises 312. The emergency access procedures may provide the plumber with full access to the premises 312 in response to an alarm received at the access server 304 of a burst pipe or other plumbing emergency. The first set of access procedures may be selected by the access server 304 for all other visits to the premises 312 by the plumber. Any number of access procedures may be associated with a user to the premises 312 based on a condition of the premises.

The one or more access procedures received from the administrator or generated from information of the user may be associated with the unique user identifier and stored in the access registry 310 at step 414. As explained in more detail below, the stored access procedures in the registry 310 may be retrieved as a user visits a premises 312 and provides the unique identifier for the user to the access server 304.

At step 416, the access server 304 may determine if an existing access procedure for a user to a premises 312 is to be modified. For example, the administrator may indicate, through the user interface, to modify an access procedure for a user for the premises 312 registered with the access system 300. The indication to modify an existing access procedure of a user may be provided by the administrator through one or more inputs to the user interface, such as through a selection of a "modify access" button or option in a menu. Causing the modification of access procedures may also be based on alterations to an estimated time/day of visitation by the user to the premises 312. For example, a delivery company may provide updates to the access server 304 on an estimated time of delivery as the delivery person travels a delivery route. The delivery person may be running behind schedule such that the estimated time of delivery may be altered. The access procedures for the delivery person may be modified by the access server 304 as information about the estimated day/time of delivery is adjusted. For example, a package may originally be estimated to be delivered on a Thursday at 5:00 pm. However, due to delay in shipping, a new shipping date and time of Friday at 2:00 pm may be provided to the access server 304. The access server 304 may adjust the access procedures for the delivery person to account for the delay in the estimated delivery day/time to accommodate the homeowner's Friday schedule. Other changes in the estimated access of the premises may also result in modifications to the access procedures. For example, a maintenance order may be altered to include the delivery of a large appliance such that a higher level of access to the premises 312 may be granted to maintenance workers to accommodate the delivery of the large appliance. Such a higher level of access may include access to a garage entrance or other large entry of the premises for the large appliance.

Existing access procedures may be caused to be modified over time as a user to the premises 312 becomes more trusted by the administrator. For example, access procedures for a dog-walker may initially be limited to granting access to a backyard area, via the unlocking of a gate and disabling of a security camera in the backyard. The access procedures may also include notifying the homeowner of the access granted to the dog-walker. After one or more visits to the premises 312 by the dog-walker, however, the access procedures may be modified by the access server 304, such as providing additional access to the premises or no longer notifying the homeowner of the dog-walker's access. A contractor may be provided access to a premises during a home renovation through one or more access procedures. During an initial few visits to the premises 312, the access procedures associated with the contractor may prompt the administrator of the premises to monitor one or more security devices 316 to watch the contractor's movements through the home. Over time, the access server 304 may learn which areas of the premises to which the contractor may request access and modify the access procedures for the contractor in response to aid the contractor in the renovations. For example, the access server 304 or homeowner may determine which entry way the contractor may use for bringing in supplies, which bathroom he should use during the renovation, which windows may be opened for paint to dry, etc. Access procedures for the contractor may thus be modified to provide the additional access to the contractor as the access server 304 learns of the contractor's movements in the premises.

Access procedures may also be caused to be modified in response to requests for access from the user received at the access server 304. For example, a repair man may come to fix a hot water tank at the premises 312. An initial access procedure may be set up for the repair man in the access registry 310, such as via the administrator providing the access procedure or via a received communication at the access server 304. During the repair, the repair man may request additional access to the premises 312, such as access to a kitchen area to test the water temperature. The request may be sent to the administrator of the premises 312 and the homeowner may agree to the additional access. The request may also be sent directly to the access server 304, such as through the visitor communication device 308, and the access server 304 may determine an additional access procedure to apply to the request. For example, based on one or more access rules or considerations provided by the administrator to the access server 304, the access server may determine that access to the kitchen may be provided to the repair man. The access to the kitchen may also be included in the access procedures associated with the repair man as a modification to the access procedures. The modified access procedures may also include sending a notification to the user communication device 302 to alert the administrator of a change to the access procedures for the repair man.

If an access procedure is to be modified, the access server 304 may receive identification information of a registered user associated with a premises 312 for which the access procedure is to be modified in step 418. The identification information of the user may be transmitted to the access server 304 from the administrator device 302 of the administrator via the user interface. The user identification information may include any of the above listed types of identifying information, including the unique identifier for the user provided by the access server 304. For example, the access server 304 may provide, via the user interface, a listing of all registered users to the premises 312. The administrator, via the administrator device 302, may select from the listing of users, the particular user for which an access procedure is to be modified. In another example, the administrator may provide the unique identifier for the user for which an access procedure is to be modified through other inputs, such as a text box within the user interface. The identifying information for the user may also be determined from a communication or other information associated with the user. For example, the user identification information may be determined from an email or text message associated with a delivery to or a scheduled maintenance on the premises 312. The identifying information may also be received from the user during an access request, such as via the visitor communication device 308.

At step 420, one or more access procedures associated with the user identifier may be retrieved, such as from the access registry 310. If no access procedures are associated with the user identifier, an error message may be retrieved and provided to the user interface or administrator device 302. At step 422, one or more modifications to an access procedure for the user may be received at the access server 304. Modifications may include any alteration to an access procedure, such as removing of steps within the access procedure, addition of steps to the access procedure, changes to the settings for a step within the access procedure, replacement of steps of the procedure with other steps, addition of steps to include newly purchased or installed devices 314-322 within the premises 312, changes to announcements to be provided by the announcement devices 322, application of access procedures to other users registered with the premises, increase or decrease in a time period of a step of the access procedure, and the like. Such modifications may be stored in the access registry 310 by the access server 304 at step 424. The storing of the access procedures may include associating the modification to the access procedures with the user identifier.

At step 426, the administrator may provide information to log-off from the user interface of the access server 304 and, at step 428, the access server may log-off the administrator from the user interface. Additional changes to the access procedures for the premises, including the addition of new users or the removal of registered users, may be executed by the administrator through logging back into the access server 304 or user interface.

Figure 5:
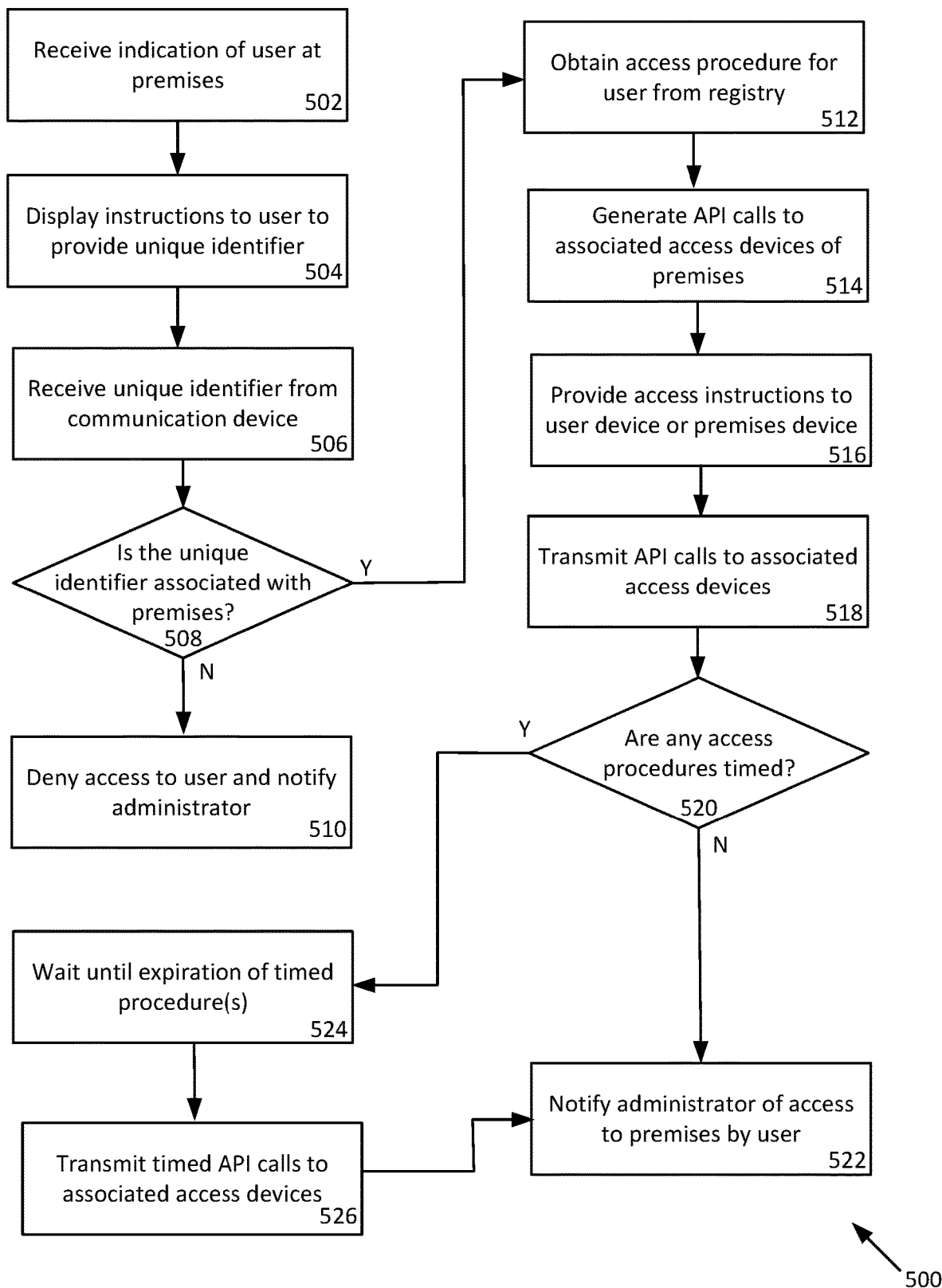
FIG. 5 is a flow chart showing an example method for granting user limited access to a premises based on one or more access procedures.

Through the one or more access procedures associated with a user to a premises 312, the user may be granted some level of access to the premises. FIG. 5 is a flow chart showing an example method 500 for granting user limited access to a premises 312 based on one or more access procedures. The access procedures discussed above may be applied to the premises 312 after an identification of the user to provide the limited access to the premises as determined by the administrator. Although the steps of the method 500 of FIG. 5 are described as being performed by the access server 304, any component of the system 100 of FIG. 1 or the system 300 of FIG. 3 may perform one or more of the steps of the method.

At step 502, the access server 304 may receive an indication of the presence of a user at the premises 312. The indication of the user presence at the premises 312 may be received from several sources. For example, the user may approach the premises 312 and press a button on a doorbell device mounted on the premises. The doorbell device may be a smart doorbell device that connects to the Internet or other communication network. Based on the press of the button on the doorbell device, a notification of a visitor to the premises 312 may be sent to the access server 304 indicating a visitor to the premises. A camera or motion detector device of the premises 312 may detect the presence of the visitor to the premises. The user may provide the indication of the presence at the premises 312 through one or more visitor communication devices 308. For example, the user may text the access server 304 the indication or may call a designated telephone number using a smart phone that alerts the access server to the user's presence at the premises 312. The indication of the user at the premises 312 to the access server 304 may come from any component of the system 300 or communication devices not illustrated in the system 300 with communication capabilities with the access server.

Figure 6:
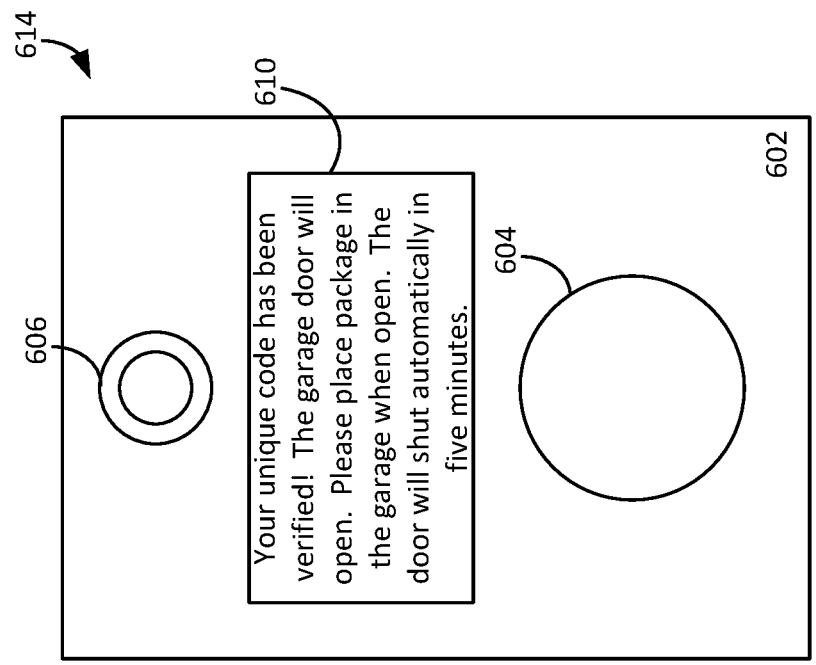
FIG. 6 shows an example displaying of access messages used for granting user limited access to a premises for based on one or more access procedures.
Figure 6:
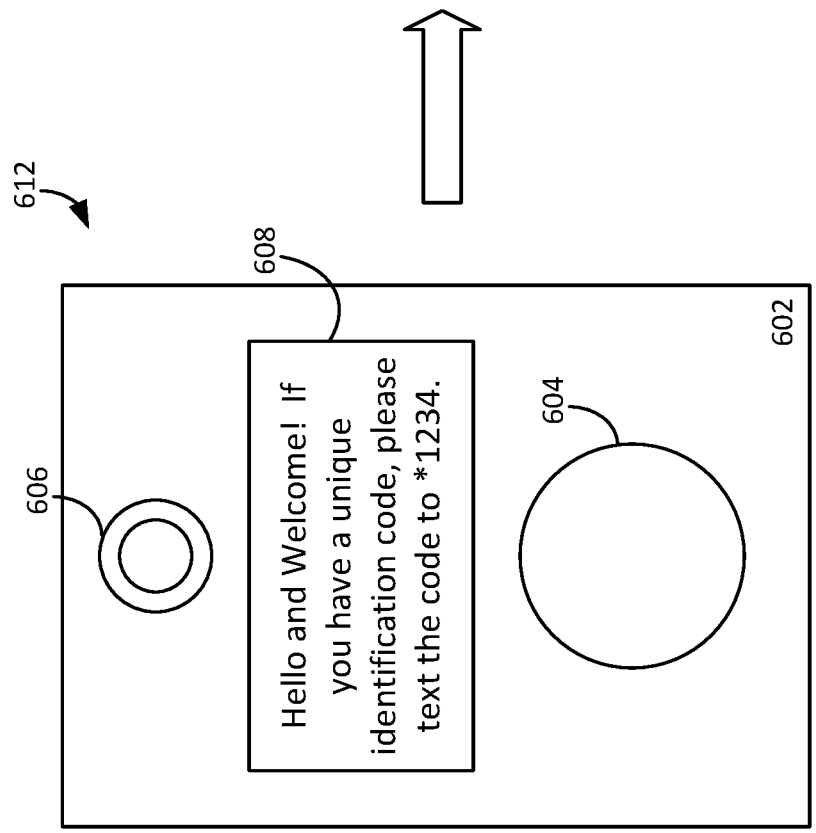

At step 504, instructions may be displayed to the user visitor to the premises to instruct the user to provide the unique identifier of the user to the access server 304. FIG. 6 shows an example doorbell device 602 displaying instructions to a user visitor to a premises 312 to provide a unique identifier to the access server (doorbell device example 612). Any display may be used to provide instructions to a visiting user, such as a placard, sign, configurable display, audio device (such as a speaker), an intercom, and the like. Any device of the premises 312 may include the instructions display. The doorbell device 602 is provided as an example of one type of display device for providing the instructions to the user.

The doorbell device 602 may include an activation button 604. The activation button 604 may be the button pressed by the user that activates the indicator to the access server 304 that the user is present at the premises 312. The doorbell device 602 may include additional security features, such as a camera 606 that is accessible through a wireless connection to the doorbell device. A display portion 608 of the doorbell device 602 may include an announcement 608 or other display that provides instructions to a visitor to the premises 312. The instructions 608 may instruct the user visitor to provide a unique identifier to the access server 304, if the user has an associated unique identifier. Some visitors to the premises 312 may not have a unique identification code associated with the visitor. In such instances, access procedures may not be executed for the premises 312. Users that have a unique identification code may follow the instructions 608 displayed to provide the associated code to the access server 304. For example, the user may use a visitor communication device 308 to text the unique code to a displayed telephone or text number. In another example, the user may call a telephone number and verbally provide the unique identifier code to an operator or to an answering computing device.

As described above, the user may have knowledge of the unique identifier associated with the user. For example, the access server 304 may provide the unique identifier of the user to a communication device (such as a smart phone) or connection method (such as an email address) of the user. The user may not have been previously provided the unique identifier associated with the user before visiting the premises 312. For example, a delivery person to the premises 312 may not receive a unique identifier prior to visiting the premises to deliver a package, although a unique identifier has been generated by the access server 304 in response to the administrator setting up one or more access procedures for the delivery person. The unique identifier associated with the user may thus be provided to the user through the display 608 or through a visitor communication device 308. The unique identifier of the user may also be associated with a package being delivered by the user, such as a tracking number or other identifier of the package.

To receive the unique identifier, a user may identify themselves to the access server 304 with one or more of the user information discussed above. For example, the user may provide a name and identification number (such as a social security number) to the access server 304 to receive the unique identifier. Biometric information from a fingerprint scanner or facial recognition device may be determined from the user and provided to the access server 304 to identify the user and the unique identifier of the user. Information related to the purpose of the visit to the premises 312 by the user may also be used. For example, a delivery person may provide a tracking number of a package to the access server 304 to identify the user. A repair person may provide an order number associated with the repair to identify the repair person to the access server 304. Fire and/or other emergency personnel may also be given a unique code that provides access to the premises 312. The emergency unique code is thus associated with the job of the user and may be shared among all emergency personnel.

The unique identifier of the user may also be provided to the user only during an access window associated with the user. For example, the delivery of a package may be estimated to occur on a particular day or even within a particular time window of a particular day. For such deliveries, a unique identifier code may be generated for the delivery person. The unique identifier may only be provided, however, to a requesting delivery person if the user identification information (such as the tracking number of the package) is received at the access server 304 within the estimated time window for delivery of the package. Requesting the unique identifier before or after the estimated time window for delivery may result in a rejection by the access server 304.

The unique identifier of the user to the premises 312 may be received at step 506 through any of the procedures discussed above. Continuing the above example, the unique identifier of the user may be texted to the access server 304 through a visitor communication device 308. At step 508, the access server 304 may determine that the unique identifier provided by the user is associated with the premises 312. For example, the access server 304 may compare the received unique identifier with a listing of unique identifiers of users registered or otherwise associated with the premises 312. If the received unique identifier is not associated with the premises 312, the access server 304 may deny access to the premises to the user at step 510. The access server 304 may also notify the premises administrator that a user has requested access to the premises. This notification may include sending an alert to a device 302 of the administrator, such as a smart phone, computer, tablet, etc. associated with the administrator.

The user identification information provided to the access server 304 may act as the unique identifier for some users to the premises 312. For example, instead of verifying the identity of the user through the user identification information and providing the unique identifier to the user, the access server 304 may determine the unique identifier based on the user identification information. The access server 304 may compare the determined unique identifier based on the user identification information at step 508 to determine if the user is associated with the premises 312. This may skip the step of providing the unique identifier to the visitor device 308 or displaying the unique identifier on a display portion 608 of the premises 312.

The access server 304 may, at step 512, determine one or more access procedures associated with the unique identifier of the user from the access registry 310. As mentioned above, one or more access procedures for providing access to a premises 312 for a user may be stored in the access registry 310 associated with a unique identifier of the user. The one or more access procedures may include information or instructions to activate and use access devices 314-322 of the premises to provide some variable level of access to the premises. The access procedure may define the access devices 314-322 used in the procedure, a sequence of activation or use of the devices, conditions in activation of use of the devices, time periods associated with use of the devices, information or settings requested from the access devices, and the like. Any functionality of the access devices 314-322 may be included in an access procedure associated with the premises 312.

As any number of access procedures may be associated with the user, additional information may be used by the access server 304 to select the access procedures for the user. For example, a set of access procedures for a plumber or electrician may be stored in the access registry 310 for emergency situations. The emergency access procedure may provide the plumber or electrician with additional access to areas of the premises to address the emergency situation. The access server 304 may receive an alert or other indication of the condition of the premises 312 that may be used to determine which set of access procedures for a user is determined. Selection of a default set of access procedures may occur for a typical visit to the premises 312.

To execute the one or more access procedures, a series of instructions or calls to the access devices 314-322 or control system 320 may be generated by the access server 304 at step 514. The calls provide the instructions to control the various aspects of the access devices 314-322 to perform the steps of the access procedures. For example, a call or series of calls may be generated to program a keypad associated with a door of the premises 312 with a one-time use code to unlock the door. A call to activate a garage door opener to open the garage door may be generated. One or more calls to a security camera to turn on the security camera, record for a time period, and turn off the camera may be associated with the access procedure. Any instruction, packet, or communication to transmit to one or more of the access devices 314-322 may be generated to execute the one or access procedures determined from the access registry 310.

Generation of the instructions or calls to the access devices 314-322 or control system 320 of the premises 312 may include using an application programming interface (API) to translate an instruction into a protocol that is accepted by the corresponding access device. For example, each of the access devices 314-322 of the premises 312 may communicate using a unique communication protocol such that an instruction sent to a camera device may be of a different format or protocol than an instruction sent to a keypad of a door. As each of the access devices 314-322 of the premises 312 may use a different communication protocol or format to receive control instructions and provide operational information, one or more APIs may be used by the access server 304 to translate the instructions into a communication format associated with the target access device 314-322. The APIs may be associated with a control application or interface associated with the target device. For example, a wireless doorbell device may be associated with an application to receive and provide communications between the doorbell device and a user's computing device. The access server 304 may include one or more associated application to interface with one or of the access devices 314-322 of the premises 312. Through the applications, the access server 304 may transmit control instructions to the access devices 314-322 to execute the one or more access procedures for the identified user to the premises 312.

At step 516, the access server 304 may provide one or more access instructions or descriptions to a visitor device (such as the visitor communication device 308 or a display device of the premises 312. For example, FIG. 6 also shows an example doorbell device 602 displaying instructions to a user visitor to a premises 312 to interact with the access procedure for the user (doorbell device example 614). Although the doorbell display 614 is discussed, any display device of the premises 312 may include the instructions display. The doorbell device 602 is provided as an example of one type of display device for providing the instructions to the user.

The display portion 610 of this instance 614 of the doorbell device 602 may include an announcement or other display that provides instructions to a visitor to the premises 312. The instructions provide directions to the user on how to interact with an executed access procedure or otherwise inform the user of the access granted to the user. For example, the display 610 may include "Your unique code has been verified! The garage door will open. Please place package in the garage when open. The door will shut automatically in five minutes." In this example, the access procedure for the user includes activating a garage entry activator 318 to open the garage, waiting for five minutes, and activating the garage entry activator to close the garage. In another example, the display 610 may instruct the user to "Please proceed to the side of house. Use one-time code 1a2b3c for mudroom access at the side door and leave the package. The alarm will be disabled for 30 seconds and your actions will be recorded. The system will re-arm once the door closes and the code will no longer work." The instructions to the access devices 314-322 accompanying this description may include a programming instruction to a keypad device 314 of the side door, a disabling instruction to an alarm system 316, an activation instruction to a camera device 320, and an activating instruction to the alarm system after 30 seconds has expired. Thus, the description and instructions provided to the user may correspond to one or more of the instructions of the access procedure for the user.

At step 518, the generated API calls or instructions may be sent to the access devices 314-322 or control system 320 of the premises 320 via a communication network, such as the Internet. As described above, the access devices 314-322 may use a wireless connection to receive instructions and provide information to the access server 304. A wired connection may also be used for communication. For some access procedures, the instructions may be sequenced such that some instructions are sent subsequent to other instructions to perform the access procedure. Some instructions may also be time-based in that the instructions are sent after the expiration of a time period, as discussed in more detail below. One or more of the access devices 314-322 may also be configured to provide acknowledgment messages in response to a received instruction. The acknowledgment message may be transmitted to the access server 304 for verification of the execution of the sent instructions. Communications between the access server 304, the control system 320, and/or the access devices 314-322 may thus be two-way communications to execute the one or more access procedures for the user at the premises 312.

The access server 304 may determine, at step 520, if one or more of the access procedures include a timed operation. For example, the access procedure may include opening a garage door for a time period, such as five minutes. Other times access procedures may include disabling a security device 316 for a time period, displaying an announcement on an announcement device 322 for a time period, activating a presence detector 320 for a time period, etc. If the access procedure includes a timed operation, the access device may, at step 524, wait until the expiration of the time period for the operation and, at step 526, transmit the timed call or instruction to the affected access device 314-322. For example and in relation to an access procedure, the access server 304 may transmit an instruction to a garage door activator 318 to open a garage door of the premises, wait until a five minute time period has expired, and transmit another instruction to the garage door activator to close the garage. Activation and disabling of security devices 316 and/or presence detectors 320 may occur in a similar manner with a time period between transmissions of the instructions to the device.

If the access procedure does not include a timed operation or after the timed operations of the access procedure has expired, the access server 304 may notify the administrator of the premises 312 of the access granted to the user at step 522. The notification may be provided to a administrator device 302 of the administrator, via a text message, a video file of the user accessing the premises, an email alert sent to an email address of the administrator, and the like. A summary of the access procedure executed may also be provided to the administrator for review by the administrator for modifications to the one or more access procedures for the user.

Figure 7:
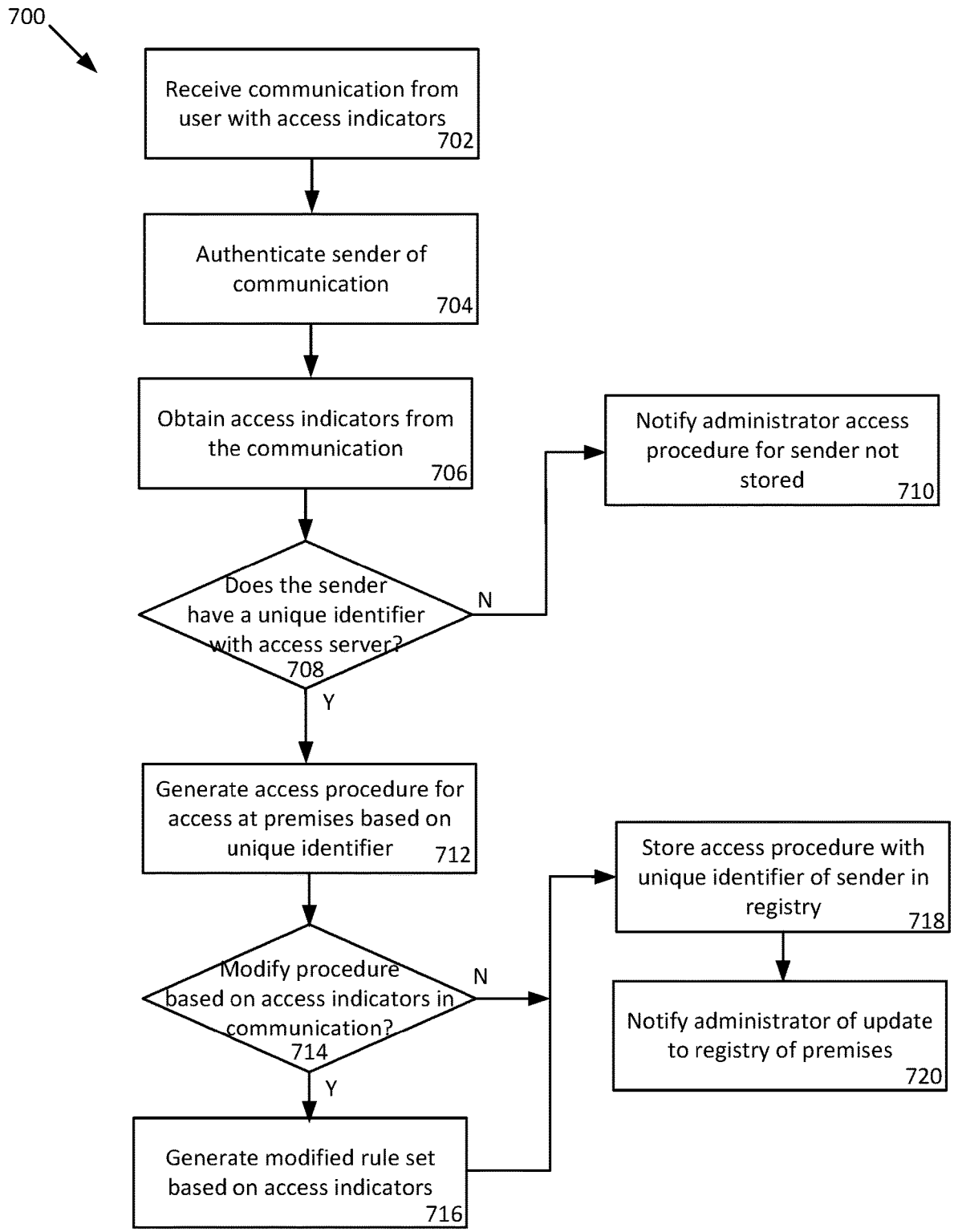
FIG. 7 is a flow chart showing an example method for generating one or more access procedures for a premises for granting user limited access from a communication received from the user.

Through the method 500 of FIG. 5, one or more access procedures may be executed to provide a level of access to a user visiting a premises 312. The access procedures may be provided by a premises 312 administrator through a user interface to the access server 304, as described. One or more aspects or operations of the access procedures for a user may also be generated by the access server 304 based on a received communication, information of the identity of the user, and/or access procedures provided by the administrator for similar users to the premises 312. FIG. 7 is a flow chart showing an example method 700 for generating one or more access procedures for a premises 312 for granting user limited access from a communication received from the user. Although the steps of the method 700 of FIG. 7 are described as being performed by the access server 304, any component of the system 100 of FIG. 1 or the system 300 of FIG. 3 may perform one or more of the steps of the method.

Figure 8:
FIG. 8 is an example communication from a user from which one or more access procedures for a premises may be generated.
Figure 8:
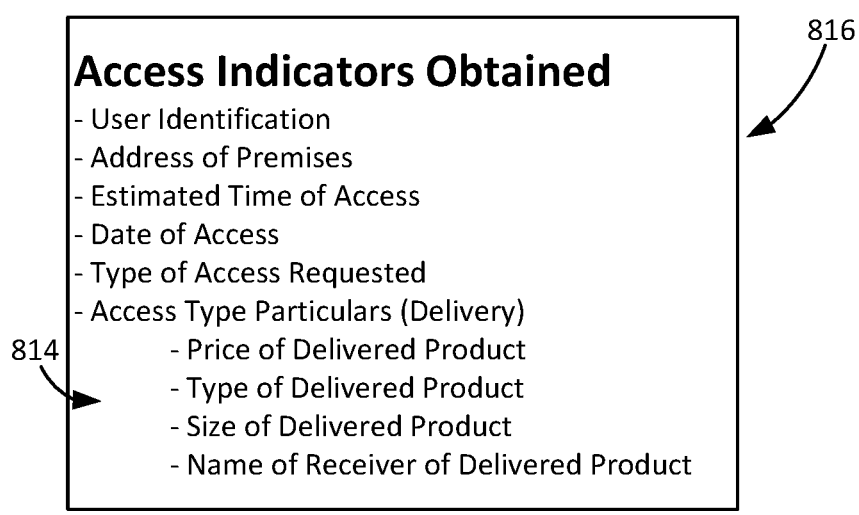

At step 702, the access server 304 may receive a communication from a user that includes one or more indicators of a type of access to the premises 312. For example, the communication may include an email from an online retailer that confirms a purchase made by a resident of the premises 312 and provides information about delivery of the package to the premises. FIG. 8 is an example communication 802 from a user from which one or more access procedures for a premises may be generated. An administrator of the premises 312 may configure interactions with one or more online retailers to include the access server 304 as a recipient of email communications from the retailer to the administrator. Other communications may be received by the access server 304 from which access parameters may be determined, such as text messages, voicemails, automated phone calls, and the like. The access server 304 may also receive the communication from other sources. For example, the administrator may provide the communication to the access server 304, such as by forwarding the email to an email address of the access server or providing the communication through the user interface of the access server. The access server 304 may also be given access to one or more computing devices and/or one or more communication applications of the administrator (or other resident of the premises 312). For example, the access server 304 may have access to an email inbox for the administrator to scan received emails for information from a user about a visit to the premises 312. The information of the user communication may be used to generate or modify one or more access procedures associated with the user, as explained in more detail below.

At step 704, the access server 304 may authenticate the sender of the communication. In some instances, a user may attempt to gain access to a premises 312 by posing as a registered user with the premises. This may include providing a fraudulent communication to the access server 304 in an attempt to gain some level of access to the premises. The access server 304 may authenticate the received communication as likely being sent from a verified user. For example, the access server 304 may save sender email addresses or IP addresses from previously sent communications and associate those email addresses or IP addresses with a sender identifier. The sending email address or IP address of a newly received communications may be compared to the stored sender information to authenticate the communication as being provided by the sender. The access server 304 may thus disregard or delete spam communications from users that are not associated with the access system 300. Other security measures to authenticate the identity of a sender of a communication may also be used.

The access server 304 may analyze the communication at step 706 to determine one or more access indicators for the user's visit to the premises 312. The communication 802 illustrated in FIG. 8 may include information from which one or more access indicators of the reason for the user to be given access to the premises 312. For example, the communication may include some identification information of the sender 804 of the communication (such as through a sender email address, a company logo, or other company name within the body of the communication). The sender information may be associated with a user identifier of the access server 304, as explained in more detail below. For example, the access server 304 may associate a company name, such as a delivery company or online retailer, with a user identifier. Other access indicators may be also determined from the communication 802, such as an address 806 of the premises 312 to verify that the communication is associated with premises, an estimated time window 808 for which access may be requested, an estimated date 810 for access to the premises, and/or a type of access requested 812 (such as delivery of a package, repair job, cleaning of the premises, installation of a product, wellness check of a resident or item of the premises, etc.).

One or more analysis techniques or machine learning procedures may be implemented by the access server 304 to determine the access indicators from the communication 802. For example, the format of communications received from various users to a premises 812 may be different such that access indicators may not be in the same location within the communication. Analyzing the communication may include searching the text within the communication for a format that indicates a particular type of access indicator. For example, an estimated date for access may have a format of "DD-MM-YYYY" or "Sep. 7, 2019", etc. An address of the premises may include a particular type of format that is recognized by the analysis technique as an address. Particular words within the communication 802 may also be searched for to determine an access indicator as to a type of access required, such as "delivery", "package", "repair", "water heater", "housecleaning", etc. One or more machine learning techniques may be applied by the access server 304 to improve the analysis of the communication 802. For example, emails from a particular user may always have the same format or layout such that the location within the communication of access indicators for the user may be saved by the access server 304 and used for subsequently received communications from the user.

Additional access indicators may be determined and/or inferred from the communication 802 that are particular to a type of access requested. For example, based on an identification of a sender or a particular word used in the communication 802, the access server 304 may determine that the access request is to deliver a package to the premises 312. Access indicators 814 particular to a package delivery may then be determined from the communication 802. Such access indicators 814 may include an estimated price of a delivered package, a type of the package, an estimated size of the package, a name of the person of the premises 312 to receive the package, etc. For access to the premises 312 for repair of an item of the premises, the access type particular 814 information may include an item of the premises to be repaired, a relative location within the premises of the repaired item, an estimated time period for performing the repair, and the like. This additional access indicators 814 particular to a type of access requested may also be determined and used by the access server 304 as described below.

As mentioned above, a premises administrator may identify one or more users for which access to the premises 312 is granted and a unique identifier may be generated for the user. At step 708, the access server 304 may determine if the sender of the communication is associated with a unique identifier of a user to the premises 312. The access server 304 may compare the sender information determined from the communication to a list of registered users to the premises 312 to determine if the sender is a registered user. If the sender does not have a unique identifier, the access server 304 may notify an administrator of the premises 312 that an access procedure for the sender of the communication is not generated and stored at step 710. This may alert the administrator to use the user interface of the access server 304 to create one or more access procedures for the sender of the communication, as described above.

Step 708 may be optional in that the access server 304 may, based on the authentication of the sender, be configured to generate a unique identifier for the sender of the communication. For example, the administrator of the premises 312 may establish, with the access server 304, particular senders of communications as verified senders that are to be associated with a unique identifier after a communication is received. The access server 304 may generate the unique identifier based on the received communication and may store the unique identifier for comparison if subsequent communications are received.

The access server 304 may generate, at step 712, a first rule set or baseline access procedure for access to the premises 312 based on the unique identifier of the user from the communication 802. For example, the unique identifier and/or access indicators may indicate a type of access to be granted to the sender of the communication 802. The administrator or the access server 304 may be configured with default access procedures for particular users. For example, a default access procedure may be established (such as from information provided by a premises administrator) for a package delivery company. The default access procedure may be applied for each visit to the premises 312 by the package delivery company. Other users, such as house cleaners or trusted neighbors, may be associated with other default access procedures. The unique identifier of the sender of the communication 802 may thus be used to determine the default access procedure for the user associated with the communication. Some users to the premises 312 may be given privilege over other user visitors. For example, a trusted repair company may be associated with a first set of access procedures while a less trusted repair company may be associated with a second set of access procedures that provides more limited access to the premises. Particular delivery companies may also be privileged over delivery companies and different access procedures may be associated with those companies accordingly.

The default access procedure may also be based on a type of access requested as determined from the access indicators in the communication 802. For example, access to the premises 312 to deliver a package may include providing access to a garage or side door of the premises as a default access procedure, regardless of which user to the premises is delivering the package. A default access procedure may also be established for all repairs to the premises, regardless of which company or repair person is requesting the access. The access indicators 816 from communication 802 may be used to determine the type of access to the premises 312 requested by a user and to apply the default access procedures.

The access procedures may also be obtained and/or determined from the communication 802. For example, an online retailer, as part of an online purchase of an item, may receive one or more access procedures from the purchaser of the item. The online retailer may receive the access procedures in a similar manner as described above in relation to the user interface. The purchaser thus may provide the access procedures to the online retailer for delivery of the item. The online retailer may include, in the communication 802, an indication of the access procedures provided by the purchaser and the access server 304 may determine the access procedures via the communication. The access procedures may be associated with the sender of the communication 802 and used for delivery of the item. The parameters of the purchase may be based on the provided access procedures. For example, the shipping cost for delivery of an item may be higher for more complicated access procedures provided by the purchaser to the online retailer.

At step 714, the access server 304 may determine if modifications to the default access procedures are to be applied based on the access indicators 814 from the communication 802. Modification to the access procedures may occur at step 716 and may be based on any information and/or access indicators 814 determined from the communication 802. For example, a time window in which the access procedure is active may be set that corresponds to the estimated date/time of delivery of a package as determined from the communication 802. Attempted accessing of the premises 312 before or after the access procedure is active may generate a denial of access to the user. The access server 304 may modify an access procedure based on a price or size of a package to be delivered, such that more expensive or larger packages may have an associated access procedure that allows the placement of the package inside the premises while a less expensive or smaller package may have an associated access procedure that allows for the package to be left on the front porch of the premises 312. Modification to an access procedure may also be based on an estimated day of access. For example, the premises may have multiple users scheduled to access the premises on the same day. The access procedures for each of the users accessing the premises 312 for that day may be modified to ensure that the users do not overlap in a location within the premises or otherwise interfere with the access granted. Access procedures for a known user may also be modified despite the user arriving on unannounced day or time. For example, a pool cleaner may arrive on a Tuesday instead of a regular visit to the premises 312 on a Wednesday. Providing the unique identifier to the access server 304 that identifies the pool cleaner may modify the access procedures for the pool cleaner to allow access on that Tuesday. The modification to the access procedures may be saved as part of the access procedures for the pool cleaner, or may be discarded at the end of the visit as an unannounced visit to the premises.

Any of the operations of the access procedure for the unique identifier may be modified based on one or more access indicators 814 determined from the communication 802. Similar to above, one or more machine learning procedures may be implemented by the access server 304 to modify the access procedures based on the access indicators determined from the communication 802 such that the rules that govern the modification to the access procedures may be provided by the administrator of the premises 312 or may be generated by the access server 304 from previously provided access procedures and/or access procedures provided for other premises also controlled by the access server.

The access server 304 may also modify the access procedures based on environmental condition information received from other sources. For example, the access server 304 may modify an estimated time of delivery of a package based on traffic information that may affect delivery of an item. The traffic information may indicate that a delivery person is behind schedule to deliver a package such that the time window for access to the premises 312 may be adjusted by the access server accordingly. The access server 304 may receive environmental condition information such as weather information from a weather reporting information source. A first access procedure for perishable items being delivered may be modified if the weather information indicates that the items may be damaged if left outside during the weather condition. For example, an item that requires refrigeration may spoil if left on the front porch of the premises during a hot day. The modified access procedures may allow access to the interior of the premises 312 and instructions to the delivery person to place the package inside the premises so that the items are not damaged by the weather. The item may thus be placed inside an air conditioned garage or other climate controlled area of the premises in response to the weather information received by the access server 304. Additional information associated with the limited access to the premises 312 may also be received by the access server 304 and used to modify the access procedures for the limited access to the premises. For example, modifications in response to weather information may be based on the user identifier such that the modifications are applied to the access procedures for some users and not applied for others.

The access server 304 may store the modified access procedures or, if the access procedures are not to be modified, the default access procedures in the access registry 310 at step 718. The stored access procedure may be executed as explained above to provide the unique identifier to the access server 304. At step 720, the access server 304 may provide a notification or alert to the premises administrator of the update to the access registry 310 corresponding to the received communication. The administrator may thus be aware that the communication was received by the access server 304, as well as making any additional modifications to the access procedures in relation to the user of the communication 802.

An access system 300 may allow a level of access to the premises for one or more user visitors. Access to the premises 312 may be provided through one or more access procedures that include a sequence or series of operations of one or more access devices 314-322 of the premises. The access procedure may be tailored to or particular to the user visitor. Individuals may self-identify themselves to an access server 304 or registry 310 after arriving at the premises 312 and receive corresponding access procedures by the access server and the one or more access devices 314-322 within the premises based on access procedures stored in the registry. The access procedures may be supplied to the access server 304 from an administrator of the premises 312, such as through a user interface to the access server. The access server 304 may control and/or facilitate the various smart access devices 314-322 of the premises 312 to execute the access procedures for the identified user. The access procedures for the user may also be generated or determined based on a communication received at the access server 304 corresponding to the user.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. A method comprising:
   receiving, from a first device associated with a first user that has access to a first portion of a premises based on access information, a request to grant the first user access to a second portion of the premises to perform an action related to the access to the first portion;
   granting, to the first user, access to the second portion; and
   sending at least one message associated with the grant of the requested access to the second portion.

2. The method of claim 1, further comprising:
   storing, for use associated with a future visit, information indicating that the first user has been granted access to the first portion and the second portion.

3. The method of claim 1, further comprising:
   sending, to a second device associated with a second user and based on the granting access to the second portion, a notification to monitor activity of the first user within the second portion.

4. The method of claim 1, further comprising granting a second user second access to the second portion, wherein the granting second access comprises avoiding overlapping access between the first user and the second user in the second portion.

5. The method of claim 1, further comprising:
   updating, based on a traffic condition, an estimated delivery time of an item,
   wherein the granting access to the second portion is further based on the updated estimated delivery time.

6. The method of claim 1, further comprising:
   causing output, to the first device and based on the granting access to the second portion, of a notification indicating a time limit corresponding to the access to the second portion.

7. The method of claim 1,
   wherein the granting access to the second portion comprises determining, based on weather information, that a delivery item associated with the first user is susceptible to damage.

8. The method of claim 1, further comprising:
   determining the second portion based on weather information.

9. A method comprising:
   receiving, from a device associated with a user that has been granted temporary access to a premises based on access information, a request for a grant of additional access to the premises;
   determining that a period of time, since the user was granted the temporary access to the premises, satisfies a threshold; and
   based on the determining that the period of time satisfies the threshold, determining updated access information that indicates granting of the additional access.

10. The method of claim 9, further comprising modifying access procedures for a plurality of users to ensure that access by each user, of the plurality of users, does not overlap in a location within the premises.

11. The method of claim 9, wherein the determining updated access information that indicates granting of the additional access is further based on a detected emergency situation occurring at the premises.

12. The method of claim 9,
    wherein the determining updated access information that indicates granting of the additional access is further based on weather information indicating that a delivery item associated with the user is susceptible to damage.

13. The method of claim 9, wherein the request for additional access to the premises indicates a size of a delivery item that the user is delivering to the premises.

14. The method of claim 9, further comprising:
    determining, based on the updated access information, whether to send a notification indicating the granting of the additional access.

15. The method of claim 9, further comprising:
    accessing, from a calendar application of a user device, an indication that an administrator of the premises is present at the premises; and
    modifying an access procedure associated with the additional access based on the indication that the administrator is present.

16. A method comprising:
    receiving, from a device associated with a first user, a request for first access to a first portion of a premises;
    granting, based on access information associated with the first user, the first access to the first portion of the premises;
    causing output, to the device and based on the granting of the first access, of an indication of a time limit corresponding to the granted first access; and
    denying a request for second access to a different portion of the premises based on determining that the second access would occur before expiration of the time limit.

17. The method of claim 16, further comprising:
    sending, to a second device and based on the granting access, a notification to monitor activity of the first user within the premises.

18. The method of claim 16, wherein the causing the output of the indication of the time limit is further based on a trust level of the first user indicated by the access information.

* * * * *